United States Patent [19]

Mittendorf

[11] 4,178,034
[45] Dec. 11, 1979

[54] VEHICLE INSECT PROTECTION APPARATUS

[76] Inventor: Theodor H. Mittendorf, P.O. Box 1138, Mount Dora, Fla. 32757

[21] Appl. No.: 873,211

[22] Filed: Jan. 30, 1978

[51] Int. Cl.² ............................................. B60K 11/02
[52] U.S. Cl. ................................... 296/91; 180/68 P
[58] Field of Search .................. 296/91; 180/68 P; 293/64–66; 160/DIG. 1, DIG. 2

[56] References Cited

U.S. PATENT DOCUMENTS

| | | | |
|---|---|---|---|
| 2,650,126 | 8/1953 | Barnas | 293/64 |
| 2,730,396 | 1/1956 | Johnson | 293/66 |
| 3,610,609 | 5/1971 | Sobel | 293/65 |
| 3,987,863 | 10/1976 | Mittendorf | 296/91 |
| 4,040,498 | 8/1977 | Johnson | 296/91 |

*Primary Examiner*—Philip Goodman
*Attorney, Agent, or Firm*—Duckworth, Hobby, Allen & Pettis

[57] ABSTRACT

An insect protection apparatus for protecting moving vehicles from insects having a rigid frame, at least partially covered with a screen, to prevent the passage of insects therethrough. The frame has a bumper attaching system which may be rapidly attached to most vehicle bumpers and which allows the frame to be aligned in front of the vehicle. A deflector shield may also be attached to the top of the rigid frame.

3 Claims, 22 Drawing Figures

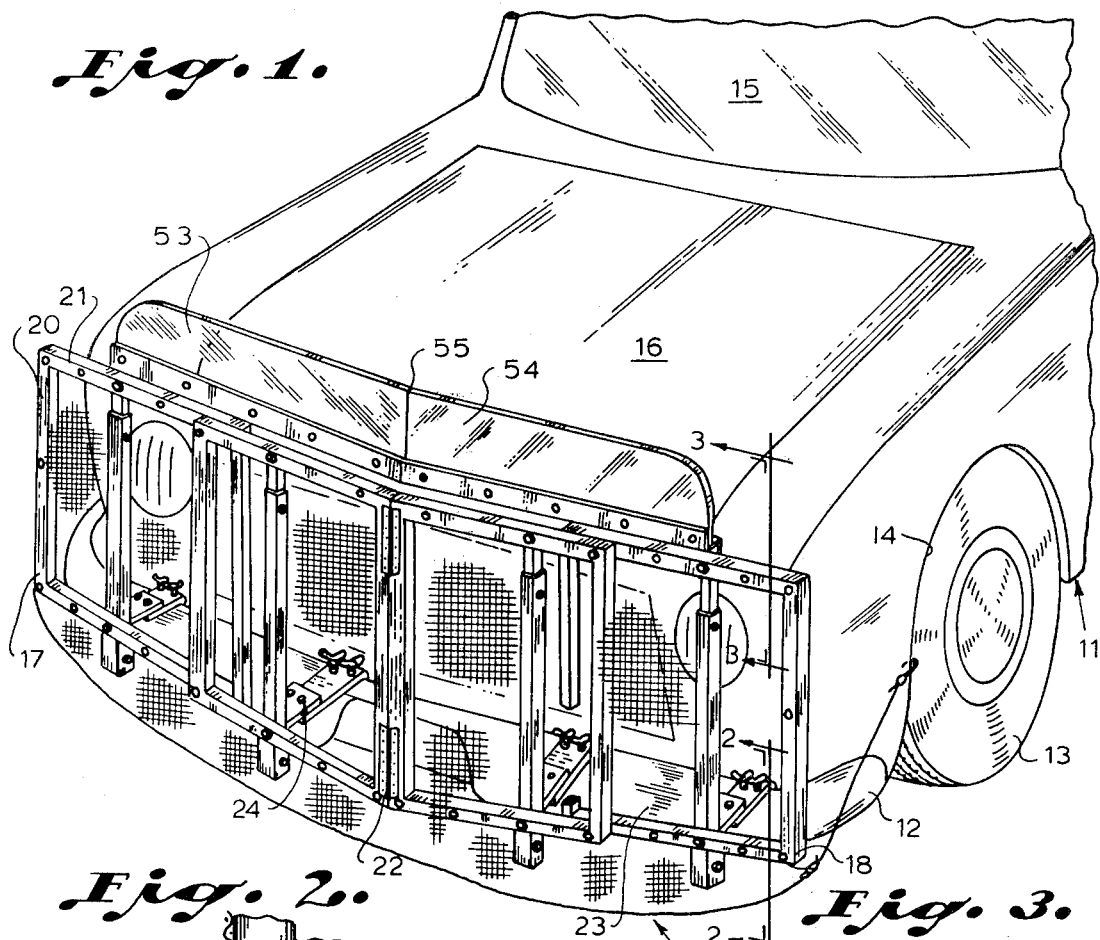
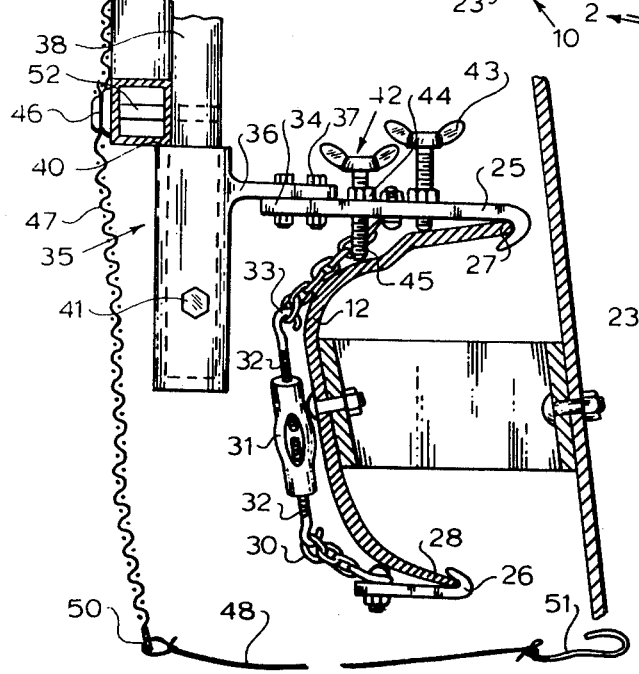

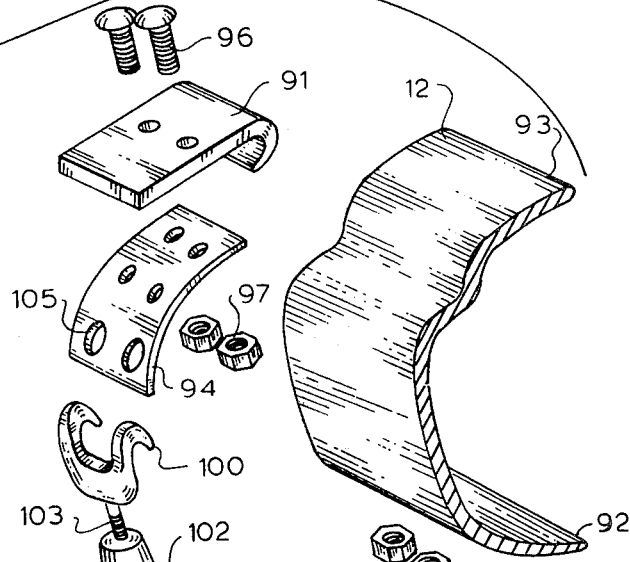
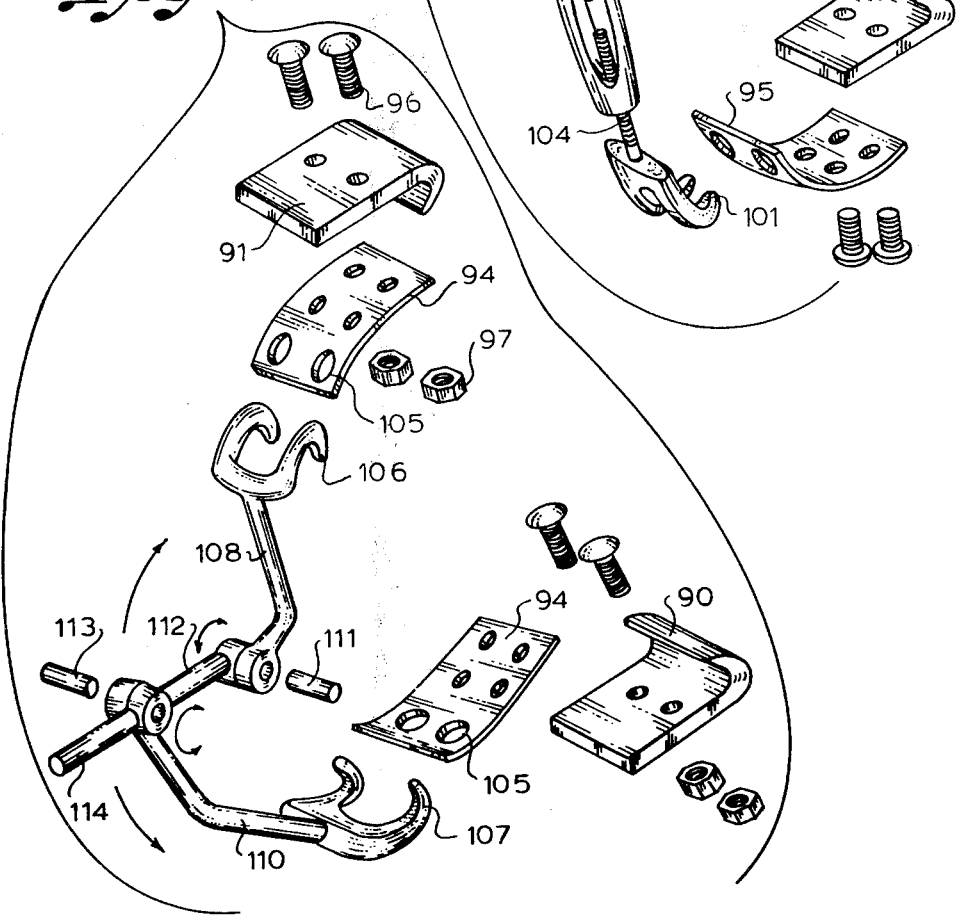
Fig. 6.
Fig. 7.

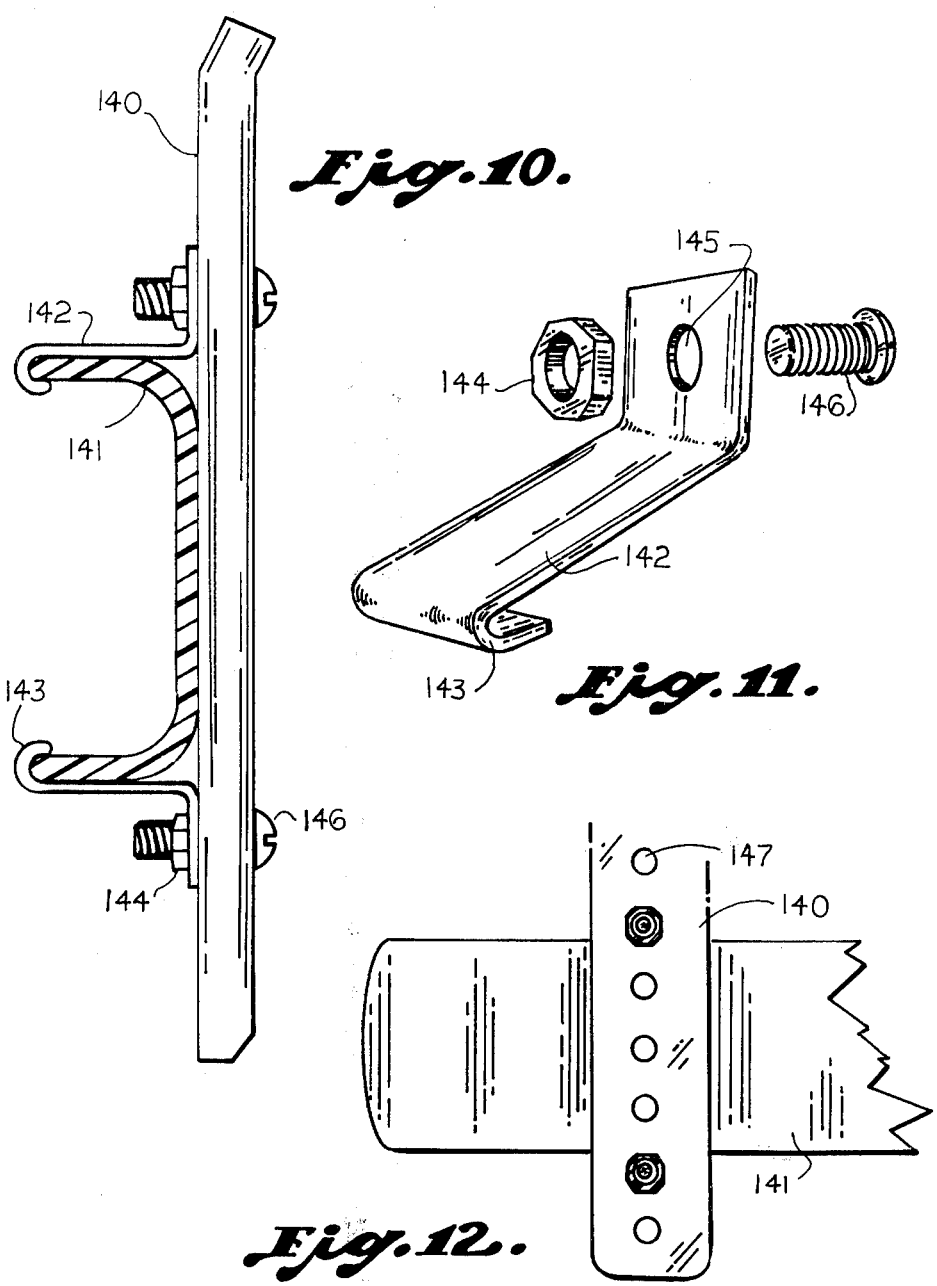

VEHICLE INSECT PROTECTION APPARATUS

BACKGROUND OF THE INVENTION

The present invention relates to a vehicle protection device for preventing insects and other materials from messing up the windshield and front end of a moving vehicle and from stopping up the radiator of the vehicle.

In the past it has been common to provide a great many deflectors for placement on different portions of a vehicle for contolling air currents and to prevent windshields from becoming messed up. One such deflector is placed on the top rear of a station wagon or automobile to control air currents to prevent the rear window from becoming covered with dirt, and the like, from the eddy currents created by the vehicle. Other such devices provide deflectors placed on the hood, or on the side vent windows for either controlling the air current or deflecting insects to prevent the insects from splattering against the windshield or from getting into the automobile. One prior U.S. Pat. No. 3,269,455 teaches a bug screen employing a metallic frame having spring loaded latching means for attaching to the front of a vehicle. Such screens are used for catching insects while similar screens on the front of vehicles are also used to prevent other trash from getting into the radiator as well as providing some crash protection for passengers in the vehicle. In addition, the present invention provides for protection for the headlights which can lose some of their reflectiveness by a large number of insects being splattered thereon and from hitting the windshield which reduces the visibility of the driver and passengers in the vehicle. This problem is especially acute in some southern states where twice a year lovebugs enter their breeding season with very large numbers of slow moving mating bugs around the highways which can completely cover the front end and windshield of a vehicle. The bugs are very difficult to clear off of the windshield and front of the vehicle and to remove from the vehicle's radiator. One protection system that has been suggested wraps a piece of screen around the front end of the vehicle. This, however, does not protect the windshield of the vehicle and still allows the front end of the vehicle to become messed up by the splattered bugs oozing through the screen onto the front of the radiator.

Other prior art includes U.S. Pat. No. 2,792,254 which is a bug and gravel shield for vehicles and includes air guides to direct air currents hitting the front of the vehicle, and U.S. Pat. No. 2,778,439 which is a combination radiator screen and insect deflector for windshields. U.S. Pat. No. 2,726,727 illustrates bracing means for the upper portion of automobile protective screens, and U.S. Pat. No. 2,868,308 illustrates a bug shield for automobiles having an attached shield. These prior patents, however, do not illustrate a combination of an insect protection screen and windshield bug deflector which are adjustable for a great variety of vehicles by being attachable to a great variety of automobile bumpers by the flexibility of the attaching system. The present system can thus be rapidly attached and detached from the vehicle.

SUMMARY OF THE INVENTION

An insect protection apparatus for moving vehicles is provided having a rigid frame with a screen covering at least a portion of the rigid frame and attached to the rigid frame. A bumper attaching system is connected to the rigid frame and may be quickly attached to the front bumper of a vehicle and is adustable for a great variety of vehicle bumpers. The bumper attaching system includes a plurality of top hooks and a plurality of bottom hooks for hooking onto the top edge and bottom edge of the bumper. Each top hook is connected to one bottom hook and includes locking members for adjustably drawing the hooks together for locking the hooks onto different sized bumpers. The rigid frame holding the screen may be aligned by adjusting the connection between the bumper attaching system and the rigid frame by threaded members passing through a bracket onto the bumper which allows the frame to be tilted on the bumper. A wind deflector shield can also be provided on the top portion of the rigid frame and additional screen can extent over the bottom. The rigid frame may include two or more rigid frame portions hinged or locked together.

BRIEF DESCRIPTION OF THE DRAWINGS

Other objects, feature and advantages of this invention will be apparent from a study of the written description and the drawings in which:

FIG. 1 is a perspective view of an insect protection apparatus for moving vehicles illustrated attached to the front end of a vehicle;

FIG. 2 is a sectional view taken along the line 2—2 of FIG. 1;

FIG. 3 is a sectional view taken along the line 3—3 of FIG. 1;

FIG. 6 is an exploded perspective view of a third embodiment of a bumper attaching system;

FIG. 7 is an exploded view of a fourth embodiment of a bumper attaching system;

FIG. 10 is a sectional view of a fifth embodiment of the bumper attaching system;

FIG. 11 is an exploded view of the brackets for the embodiment of FIG. 10; and

FIG. 12 is a front fragmentary elevation of the embodiment of FIGS. 10 and 11.

DESCRIPTION OF THE PREFERRED EMBODIMENT

Figure 4:
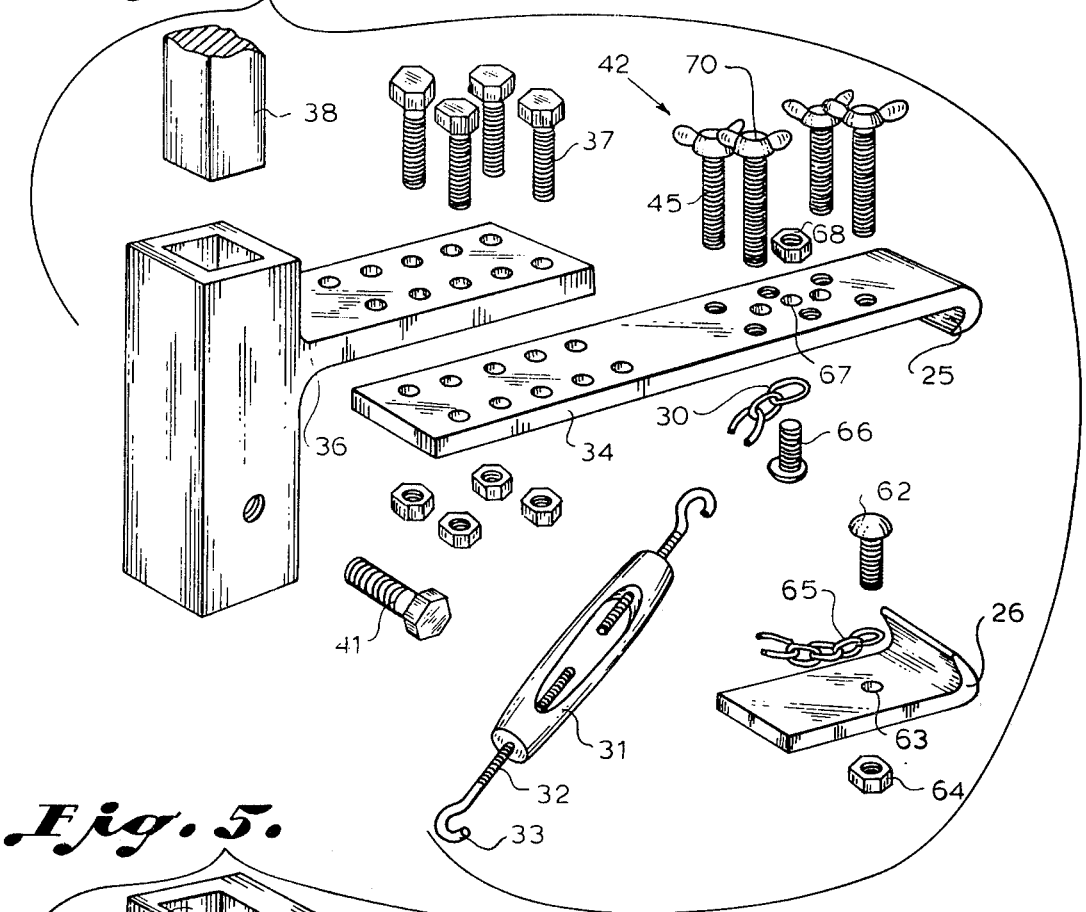
FIG. 4 is an exploded view of the bumper attaching system.

Referring to FIGS. 1 through 3 of the drawings, an insect protection system 10 is illustrated attached to a vehicle 11 having a vehicle front bumper 12, a tire 14, tire well 14, front windshield 15 and front hood 16. The insect protection apparatus 10 has a pair of rigid frames 17 and a pair of rigid frames 18 which can be made of aluminum, steel or other strong material and formed of vertical members 20 and horizontal members 21 which are attached together to form a rigid framework. Each pair of rigid frameworks is attached to the other with one or more hinges 22 so as to bend along the front of the vehicle 11 to more suitably fit the shape of the bumper 12 for protecting the front of the vehicle. The frameworks 17 and 18 are covered with a screen material 23 which can be metal, plastic or fiberglass screen as desired and can be rivetted, glued or attached to the frameworks 17 and 18 in any manner desired without departing from the spirit and scope of the invention. The frames 17 and 18 are attached to the bumpers 12 by means of a bumper attaching system 24 as more clearly illustrated in FIG. 2. A plurality of these bumper attaching systems 24 are attached to the front bumper of a vehicle and hold the frames 17 and 18 rigidly in front of the vehicle. A bumper attaching system includes top hook members 25 and bottom members 26 for engaging the top edge 27 and the bottom edge 28 respectively of the bumper 12. Each top hook 25 is connected to one bottom hook 26 with chains 30 but can also be attached by ropes, straps, or other flexible connecting material. A locking or tightening member 31 is connected in the chain 30 for drawing the hooks 26 and 25 towards each other to tighten the hooks onto the bumper edges 27 and 28.

As illustrated in FIG. 2, the hooks are locked by screwing the internal threaded bracket 31 on a pair of threaded members 32 having a hook or eye 33 which threads the members 32 towards each other, drawing the hooks 25 and 26 together and tightening onto the bumper edges. The hook 25 has a protruding portion 34 which is rigidly attached to the frame holding bracket 35 having a protruding section 36 for bolting with bolts 37, or the like, to the protruding portion 34 of the hook 25. Hook 25, of course, can be formed with the frame attaching member 35 as one integral piece if desired without departing from the spirit and scope of the invention. The frame attaching member 35 has a hollow interior portion which may be square to accept a square channel 38 protruding from the framework 17 or 18 for inserting into the hollow frame holding member 40. The frame member 38 may be bolted with a bolt 41 protruding through the opening in the hollow tube 40 if desired, even though it should be clear that the frame will hold in place without an additional attachment and that cotter pins or other attaching members can be utilized in place of a bolt. In this embodiment, the framework would be held at an angle depending upon the top angle of the bumpers, and accordingly, an alignment means 42 includes two bolts threaded through the elongated portion 34 of the hook bracket 25 and having a wing nut head 43 and lock nuts 44 which allows adjustments by threading the bolts 45 through the brackets 25 and against the bumper 12 for adjusting the angle between the protruding portion 34 of the hook 25 relative to the top portion of the bumper and thereby adjusting the angle of the frames 17 and 18 relative to the front of the vehicle 11. As can also be seen from this view, removable snap members 46 have screening 47 attached to them so that an accessory screen 47 can be quickly snapped to the frames to extend over the lower portion of the vehicle and bumper and may have a flexible cord 48 hooked through a grommet 50 at one end and having a hook 51 at the opposite end for attaching to the tire well 14. The frames 17 and 18 are illustrated as a pair of divided frames having four separate frameworks with the pairs of frames being connected with bolts 52 but a pair of single frames can also be utilized within the scope of the invention.

The top of the frames 17 and 18 have a pair of deflector shields 53 and 54 which may be hinged at 55 if desired or can merely have the edges of 53 and 54 abutting at the intersection 55. The shield is mounted as illustrated more clearly in FIG. 3, having a first angle bracket 56 attached by means of bolts 57 to the frames 17 and 18 and having a second elongated angle member 58 rigidly attached to the angle member 56 such as by welding or being formed in one extruded piece in which it attaches through a bolt 60, through the wind deflector 54 and through an elongated bracing member 61 to thereby lock the wind deflectors 53 and 54 to the frames 17 and 18. A small threaded screw 62 threads through an opening 63 in the lower hooks 26 to a nut 64 and through lock washers 65 for attaching the chain 30 to the bottom hook while a similar screw 66 attaches through one of a plurality of openings 67 to a bolt 68 for attaching the upper portion of the chain 30.

In FIG. 4 the alignment system 42 for the brackets 34 having the hooks 25 are the same as illustrated in FIGS. 1 through 3 with the exception of the hex heads 70 on the alignment bolts 42 are utlized.

Figure 5:
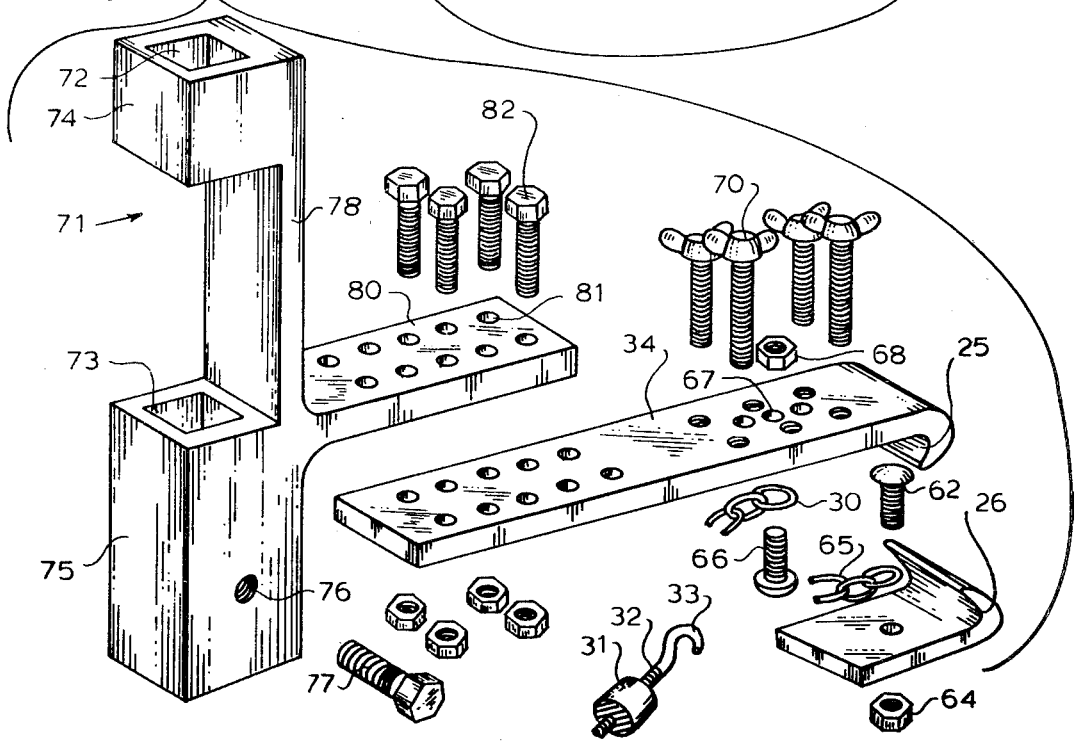
FIG. 5 is an exploded view of a second embodiment of a bumper attaching system.

FIG. 5 is identical to the embodiments in FIGS. 1 through 4 except the frame supporting brackets 71 have been cast into one unit having a passageway 72 and a passageway 73 in a top portion 74 and bottom portion 75 for sliding a vertical post of frames 17 and 18 into a threaded opening 76 for attaching the bolts 77 for locking the vertical frame members in place. The channel portions 74 and 75 are connected by center bracket portion 78 which has the protrusion 80 extending therefrom with a plurality of openings 81 for receiving the bolts 82 for attaching to the hook bracket 34 having the hook 25 and a plurality of nuts 70 for aligning the bracket 34 on different bumpers. This embodiment similarly has a chain 30, locking or tightening member 31, with tightening thread portions 33 and a bottom hook 26 along with bottom chain portion 30.

Figure 8:
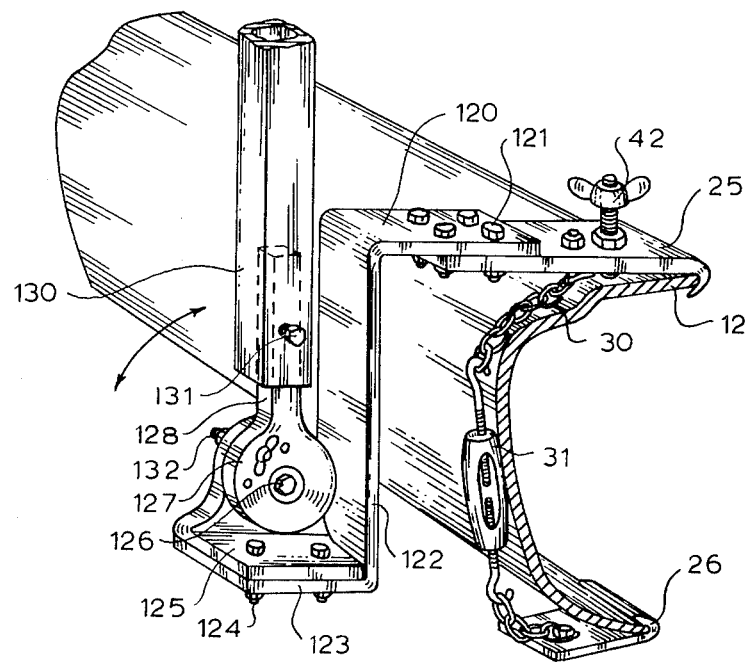
FIG. 8 is a cut-away perspective view of a bumper attaching system having a second embodiment for aligning the frame.

FIGS. 6 through 8 show three different embodiments for attaching the screen frames to bumpers, with a portion of a bumper 12 being illustrated in FIG. 6 to more clearly illustrate the attachment of the bottom hook 90 and the top hook 91 to the bumper edges 92 and 93 respectively. Each hook is similar to those already described except for strap members 94 and 95 which are held by bolts 96 attached to nuts 97 for connecting the straps to the hook brackets 90 and 91 whereby the straps 94 and 95 can connect to hooked portions 100 and 101 of a locking or tightening bracket 102 having threaded portions 103 and 104 which are threaded into the central bracket portion 102 thereby eliminating chains of the first embodiment. In the embodiment of FIG. 7 the same brackets 90 and 91 are illustrated utilizing the nuts 96, straps 94, and nuts 97. The straps are engaged in their openings 105 by means of hooks 106 and 107 which are attached to a toggle mechanism having a linkage arm 108 attached to the hooks 106 and 110 attached to the hooks 107. Arm 108 is pinned by means of a pin 111 to a lever arm 112 which in turn is pinned to the arm 110 by pin 113. Arm 110 has a handle extension 114 which allows it to be lifted, pulling the arm 110 in an upward direction while the hooks are engaged in the openings 105 of the lower strap 94 which forces the arm 108 downward with hooks 106 engaging the opening 105 of the upper strap 94 so that by one movement of the handle 114 the hooks 90 and 91 can be locked onto the bumper.

FIG. 8 illustrates yet another embodiment having the upper hook members 25 and lower hook bracket 26 as illustrated in connection with FIG. 2 and having the locking or tightening bracket 31 and chains 30 tying the bracket system to a bumper 12 and also having the adjustment bolts 42 for adjusting the bracket 25. This locking system, however, is provided with a bracket 120, bolted with bolts 121 to the hook bracket 25 and having a vertically extending portion 122 which may brace against the bumper 12, if desired, and an additional horizontal extending portion 123, having bolts 124 attaching a bracket 125 thereto. Bracket 125 is rotatably attached by means of a pin 126 to an alignment or angle adjusting member 127 having a protruding top portion 128 for protruding into a hollow square channel 130 extending from the upright rigid frame members 17 and 18. A bolt 131 can be used to lock the protruding portion 128 to the channel 130. Unlocking nut 132 allows the bell-shaped member 127 to be rotated relative to the bracket 125 for adjusting the angle of the upright frame members 17 and 18.

Figure 9:
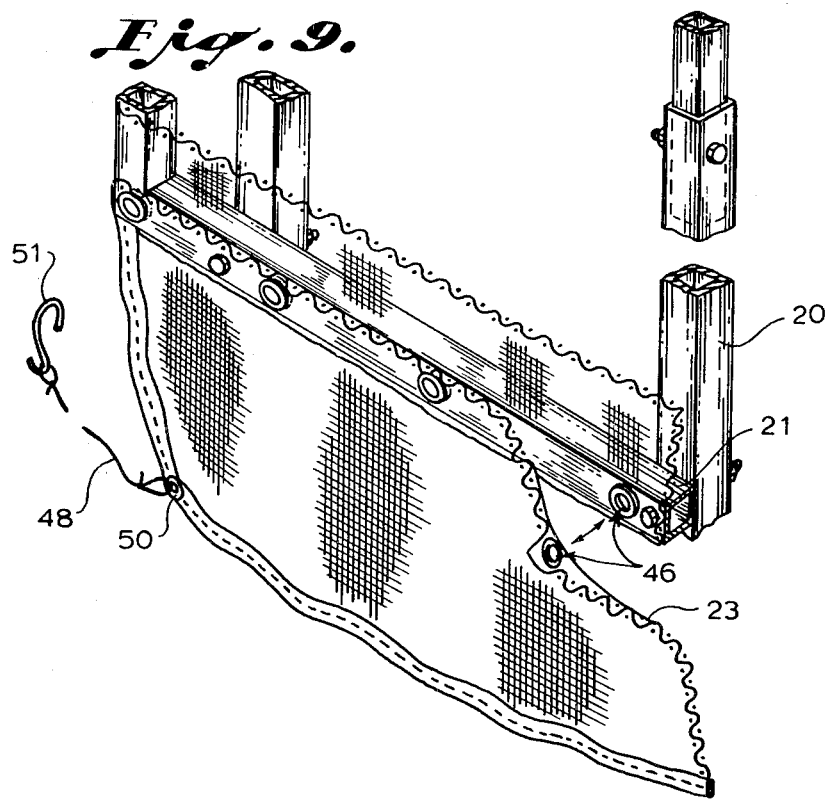
FIG. 9 is a cut-away perspective view of a bottom accessory screen.

FIG. 9 more clearly illustrates the bottom accessory screen 23 which is snapped by means of snap fasteners 46 to a horizontal extending frame member 21 which is attached to a vertical frame member 20 of the frames 17 and 18, and has an elasticized cord 48 attached to a grommet 50 on the screen 23 which is attached to its other end to a hook 51 for attaching to the tire well.

FIGS. 10, 11, and 12 show an additional embodiment of a simplified bracket having an upright screen supporting frame member 140 attached to a vehicle bumper 141 by a pair of brackets 142. Brackets 142 have a hook end portion 143 and a flanged portion 144 having an opening 145 therethrough. A pair of nuts 146 extend through the openings 147 of the upright frame member 140 and through the opening 145 of the bracket 142, and are locked with a nut 144. This system greatly simplifies the attaching system for the bumper and advantageously may be adjusted for different shaped bumpers and sizes by bolting the rod 140 along different positions for different bumpers to adjust for a vertical extension, while the brackets 142 may have their length extended by the excess length of the bolts 146. This system may also be used in connection with other embodiments to provide a quicker disconnect for the front screen if desired.

Figure 13:
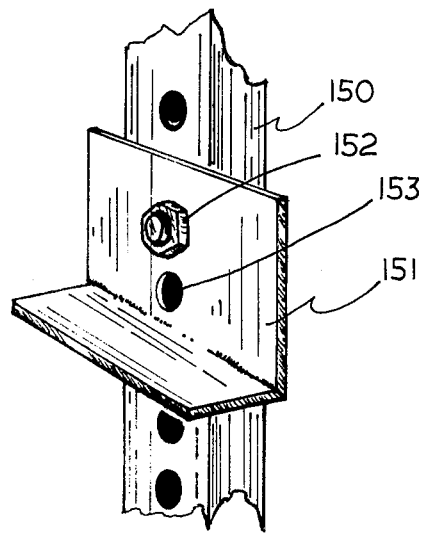
FIG. 13 is a fragmentary perspective view of a mounting brace.

Turning now to FIGS. 13 through 17, three additional embodiments are illustrated for attaching the insect protection apparatus of the present invention to a vehicle bumper. In FIG. 13, an upright 150 is attached with a nut and bolt 152 through openings 153 which extend through an angle iron bracket 151 and the upright 150. This bracket is used in connection with the embodiment illustrated in FIG. 15, in which the upright 150 has the angle bracket 151 attached by the nut 152, and a pair of brackets 151 are braced against a bumper 157 to hold the support in an upright position. The upright support 150 is held by elongated bolts 171 attached to the upper and lower side of the bumper with hook brackets 170 connecting around the bumper and held by the bolts 171 to the upright 150. However, the brackets 170 and bolts 171 on top and bottom of the bumper 157 have been found to allow the upright 150 a certain degree of movement, while the supporting braces 151 support the upright in the proper position without further attachments. The embodiment of FIG. 16 operates in the same manner as FIGS. 13 and 15, having an upright 150, an elongated bolt 171 and the brackets 170, and also having a pair of angle irons 151 bolted with bolts 152. This embodiment differs in that the upright support 150 is supported without contact against the bumper as in FIG. 15 by an intermediate brace 172 to which the angle iron 151 is bolted with the bolts 152. The intermediate support 172 is locked with nuts, as is the upright screen support 150.

Figure 14:
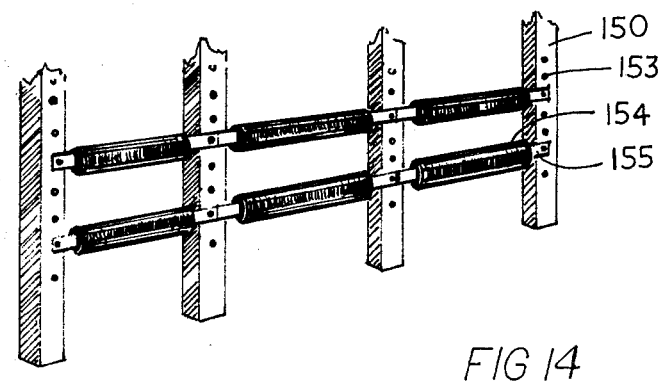
FIG. 14 is a fragmentary perspective view of another embodiment of a bumper attaching system.
Figure 15:
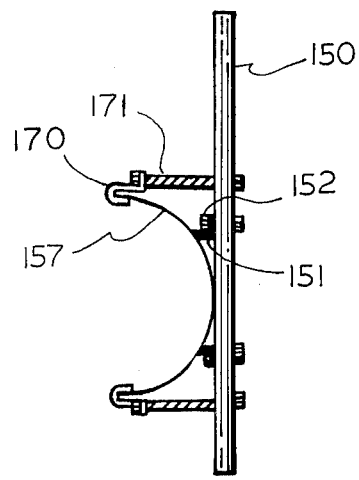
FIG. 15 is a sectional view of a bumper attached in accordance with the embodiment of FIG. 13.
Figure 16:
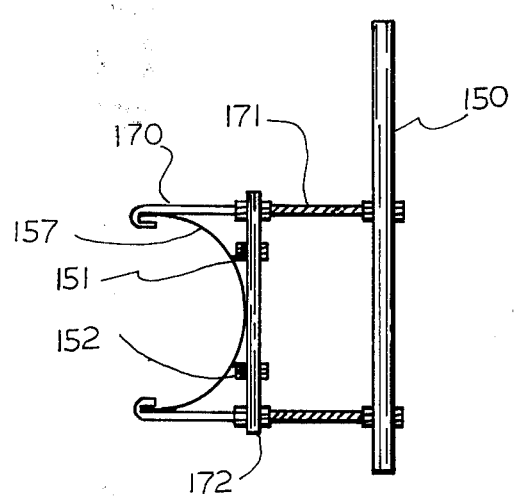
FIG. 16 is a sectional view of a modified embodiment of the system of FIGS. 13 and 15.
Figure 17:
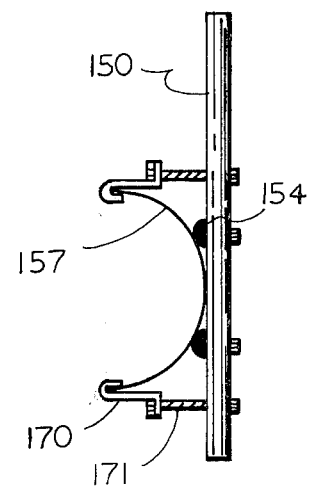
FIG. 17 is a sectional view of the embodiment of FIG. 14.

FIGS. 14 and 17 illustrate yet another variation in which the uprights 150 having the openings 153 therein connected to each other with an angle iron bracket or other connecting bar 155 which is wrapped with a soft resilient material, such as rubber or plastic material 154, which makes contact with the bumper 157, to prevent any marring of the bumper, as well as to further support the uprights 150 between each other. This embodiment includes the hook brackets 172 and the extended bolts 171.

Figure 19:
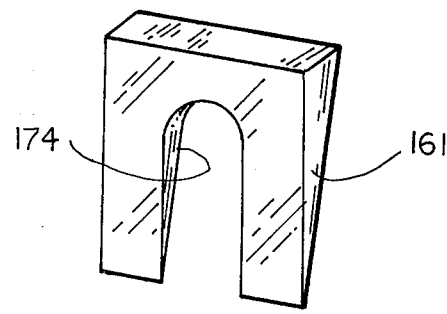
FIG. 19 is a perspective view of a wedge for use in the embodiment of FIG. 18.
Figure 18:
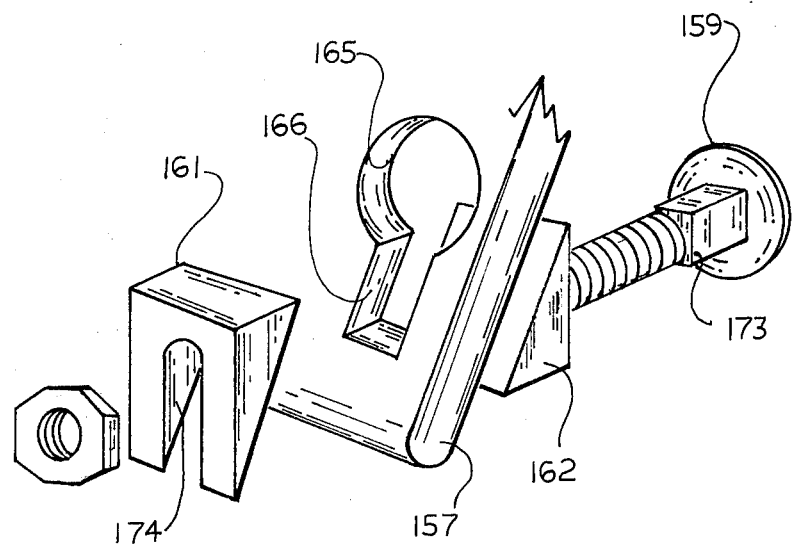
FIG. 18 is an exploded perspective view of a bumper attaching system.
Figure 20:
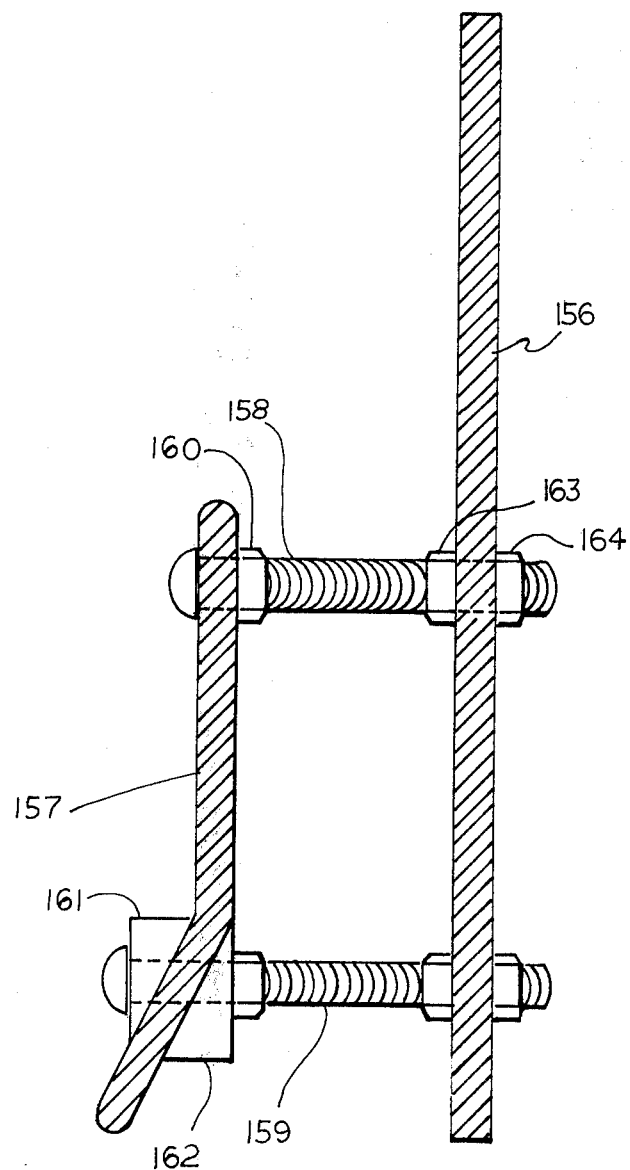
FIG. 20 is a sectional view of an embodiment of the bumper of the invention of FIGS. 18 and 19.

FIGS. 18, 19, and 20 show another embodiment for the attachment to the bumper of an original equipment vehicle which has had a bumper 157 having a key-hole shaped opening 165 therethrough at a pre-determined position. The opening 165 is a circular opening with a rectangular extension 166 extending therefrom so that a bolt 159 having a squared off portion 173 adjacent the head can be inserted through the opening 165 and slid into the rectangular portion 166 and thereby prevent it from rotating. In addition, a pair of wedges 161 and 162 are mounted on either side of the bumper 157 and each have slots 174 therein so that the nut 159 squared off portion can extend through the wedges on either side and be locked with a nut to hold the bolt in a manner for the bolts to extend straight out from an angled bumper. FIG. 19 more clearly shows the wedge 161 having a slot 174 formed therein. In FIG. 20, the bolt 159 having the wedges 161 and 162 mounted against the bumper 157, is shown with the bolts 159 being bolted to the upright screen support 156. The top portion of the bumper does not require the wedges 161 and 162 and therefore has a bolt 158 held by nut 160 to the bumper 157 and held by a pair of nuts 163 and 164 to the vertical upright 156.

Figure 21:
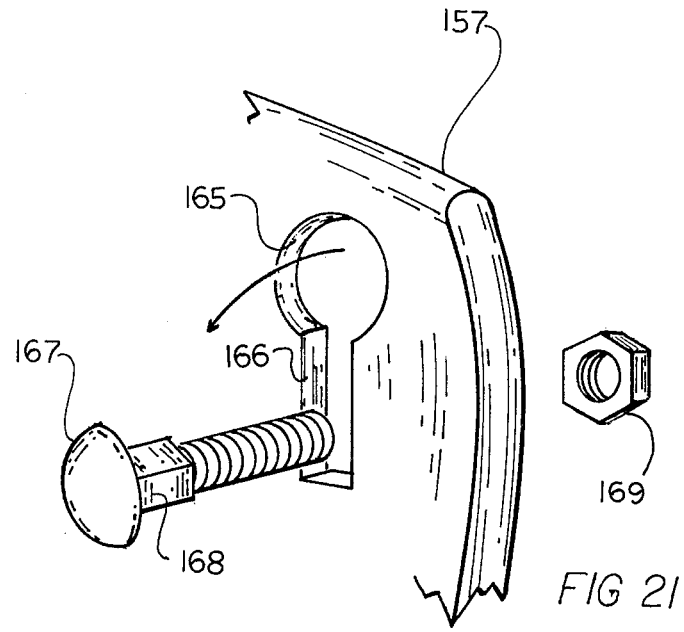
FIG. 21 is an exploded perspective of a bumper attaching member.
Figure 22:
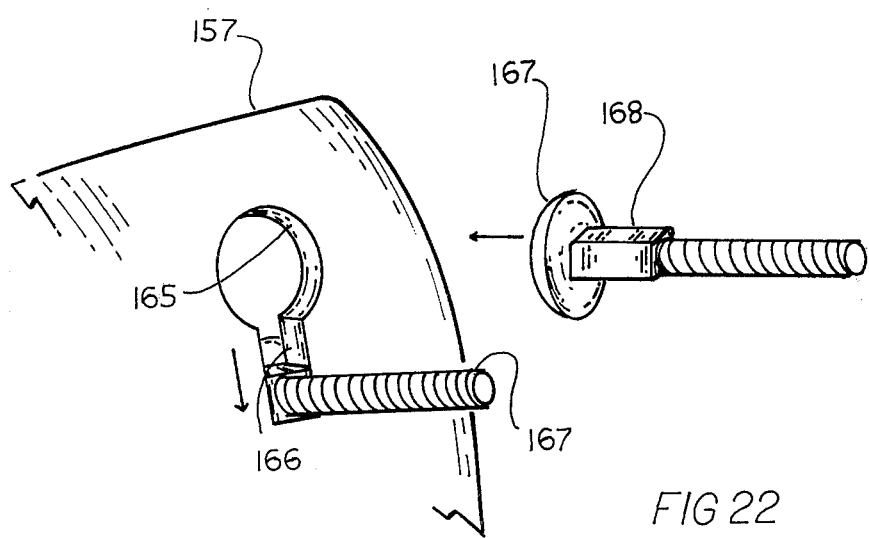
FIG. 22 is another exploded perspective of the embodiment of FIG. 21.

In the embodiment of FIGS. 21 and 22, a similar locking system is illustrated in a bumper without the use of wedges, in which a bumper 157 has an opening 165 with a rectangular slot 166 extending therefrom for insertion of a bolt 167 having a squared off portion 168 adjacent the head of the bolt 167. The head of the bolt 167 can be extended from the circular portion 165 of the bumper 157 so that it can be attached from the outside of the bumper, and then the squared off portion 168 slid into the squared off slot 166 and bolted with a bolt 169 to hold the bolt 167 in place for supporting a vertical upright without the nut 167 being able to rotate. In the case of a sharply angled embodiment, the wedges 161 and 162 of FIGS. 18, 19, and 20 would be required, and, in this embodiment, the bumper 157 would be supplied by the manufacturer with the slot 165 formed in the bumper at pre-determined locations for attaching the upright supports 156.

It should be clear at this point that several embodiments for attaching a rigid framework with screening attached thereover to the front of a vehicle have been provided for preventing bugs from hitting the front of a moving vehicle. It should also, however, be clear that this embodiment is not to be construed as limited to the particular forms disclosed herein, since these are to be regarded as illustrative rather than restrictive.

I claim:

1. An insect protection apparatus for moving vehicles comprising in combination:
    frame means having a plurality of elongated rigid frame members;
    a screen attached to said rigid frame members;
    bumper attaching means for attaching said frame members to a bumper of a vehicle for holding a screen in front of said vehicle, said bumper attaching means having a pair of brackets having hook shaped end portions on one end thereof, each said bracket being adapted to hook onto a vehicle bumper and attached with bolts to a plurality of said rigid frame members for supporting said frame members in an upright position on a vehicle bumper, and a plurality of bumper engaging brace members for engaging a bumper to prevent said elongated rigid frame members from shifting on said bumper; and
    said bumper engaging brace members being covered with a resilient material adapted to frictionally engage said bumper when said rigid frame members are attached to said bumper, said bumper engaging brace members each being attached between two elongated rigid frame members, thereby bracing said frame members to each other and against a bumper.

2. The apparatus in accordance with claim 1, in which said bumper engaging members include angle iron members bolted to said elongated rigid frame members and positioned to abut against a vehicle bumper when said elongated frame members are attached to said bumper.

3. The apparatus in accordance with claim 1, in which said bumper engaging members are attached to an intermediate plate which is attached through spacing bolts to said rigid frame members.

* * * * *